July 16, 1968  E. BREUNING  3,393,323
LIGHT BAR MONITORING SYSTEM WITH SHUTTERS
SEPARATED BY INCREASING DISTANCES
Filed June 19, 1964
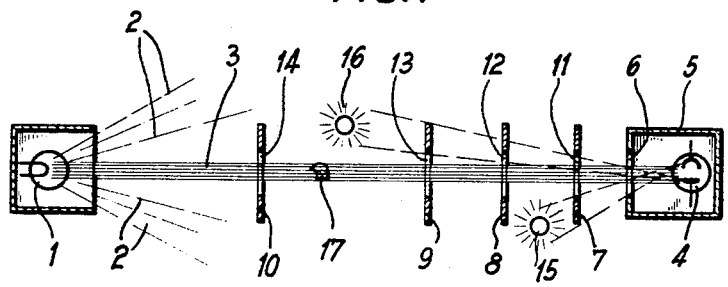
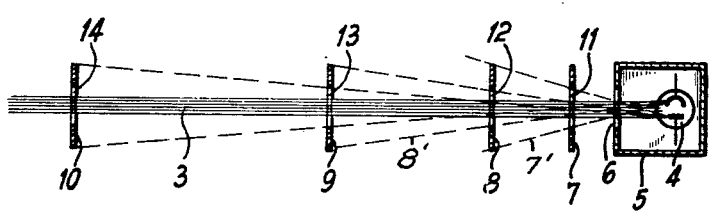
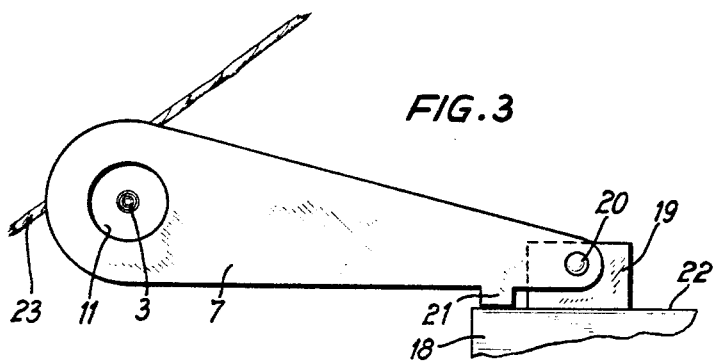
INVENTOR:
Ernst BREUNING
BY
ATTORNEY

United States Patent Office 3,393,323
Patented July 16, 1968

3,393,323
LIGHT BAR MONITORING SYSTEM WITH SHUTTERS SEPARATED BY INCREASING DISTANCES
Ernst Breuning, 6 Fruhlingsweg, 2 Gerlingen uber Stuttgart-Feuerbach, Germany
Filed June 19, 1964, Ser. No. 376,593
Claims priority, application Germany, June 20, 1963, B 72,353
3 Claims. (Cl. 250—221)

ABSTRACT OF THE DISCLOSURE

In a light bar control system, the monitoring light bar or pencil is produced by an array of aligned apertured shutters arranged in predetermined spaced relation to each other and cooperating with a light source and receiver having equal diffusely radiating and light-sensitive surfaces, respectively, to provide a light bar therebetween determined by the cross-section of and the distance between said surfaces, said bar passing through the light-pervious apertures of said shutters exceeding the cross-section of said bar. In an especially advantageous construction, the shutters have equal outer and inner diameters and are relatively spaced at increasing spacing distances in the direction from said receiver to said source, in such a manner as to cause the legs of the light acceptance angle, in respect to said light-sensitive surface, of each shutter to pass through the outer periphery of the adjacent shutter located on the side of said source. There are obtained in this manner monitoring light bars of substantial length free from the effects of interfering extraneous light sources by a minimum of shutters required.

---

The present invention relates to radiant energy barrier monitoring or detecting devices of the general type comprising a light or equivalent radiant energy beam or barrier traversing a space to be monitored as to the presence or temperary appearance therein of a foreign body or bodies, the operation of the device being based upon the body or bodies acting to weaken or intercept the radiant energy beam, such as by absorption, whereby to cause a corresponding variation of the response of a radiant energy receiver excited or impinged upon by said beam. The varying response of the radiant energy receiver, such as a photoelectric cell, is in turn utilized for the production of a warning signal and/or to operate a suitable control or output device.

Among the objects of the present invention is the provision of monitoring apparatus of the above referred to type which is both simple and economical in design and construction; which is especially suited for the detection of bodies of relatively small dimension in at least one dimension, in particular bodies of small width or thickness, such as threads, wires, or the like attenuated elements; which is highly sensitive over relatively large operating distances between the radiant energy emitting and receiving devices; and which is fully protected from the effects of interfering ambient sources, as well as from mechanical displacements or vibrations.

In the following the invention will be described with specific reference to its preferred use in connection with textile machinery of all kinds, such as spinning frames and the like processing apparatus, to detect thread or ribbon breakage during operation. As will become evident, however, the basic concept and principle of the invention as disclosed and described is susceptible of numerous other uses and applications involving principally the supervision or monitoring of an oblong cyclindrical or primsatic space traversed by a radiant energy monitoring beam to detect the presence or temporary appearance within said space of relatively small objects or bodies of the type referred to herein.

As pointed out, the space to be monitored according to the invention is of an oblong cylindrical or prismatic shape or configuration with the bodies or particles to be detected having a relatively small dimension in at least one direction, more specifically of the order of between a few millimeters to fractions of a millimeter, such as threads, thin wires and the like.

There are already known detecting or monitoring devices of the general type referred to which comprise essentially a source of radiation and a radiation-responsive receiver excited by a beam emanating from said source, whereby to weaken or reduce the intensity of said beam by foreign matter or bodies temporarily intercepting said beam and to cause a corresponding variation of the radiation incident upon said receiver to produce a response in the form of a warning signal or the like.

In the known arrangements of the foregoing type, it is customary to more or less restrict or focus the radiant energy beam emitted by the source of radiation, that is, to utilize concentrated or specular light or equivalent radiation, and to similarly limit the spread or acceptance angle of the receiver by the aid of lenses and/or shutter devices disposed in close proximity to said receiver.

All the known devices have been found principally unsuitable when it is desired to detect bodies of the type referred to, that is, which have a relatively small dimension in at least direction, more particularly of the order of from a few millimeters to a fraction of a millimeter, on the one hand, and where substantially extended operating distances, of the order of 10 meters and more, are involved. The latter condition prevails especially in the case of the preferred application of the invention, where is is desired to detect thread breakage at any point with the entire width of a spinning frame or equivalent processing apparatus involving the monitoring of a large number of threads or the like elements. The reason for the failure of the known devices and methods is due mainly to the fact that it is practically impossible, by the use of conventional techniques and means, to achieve an adequate beam concentration at a distance of the referred to order, such as is necessary, for instance, for the detection of bodies having a cross-section of one millimeter at a distance of 10 meters and more from the radiation source, as will become further apparent from the following analysis.

Let it be assumed that the radiation (light) source has a radiating surface or area of 1 mm.$^2$. In this case, a lens of for instance 50 mm. focal length produces a beam or cone of light rays having a cross-sectional area of at least 40,000 mm.$^2$ at a distance of 10 meters from said source. As a consequence, a body having a radiation-impeding cross-section of 1 mm.$^2$ and spaced by the distance mentioned reduces the total amount of the radiant energy, incident upon the receiver, by only $\frac{1}{40,000}$. Even assuming a maximum lens aperture of 400 mm.$^2$, the energy incident upon the receiver would still be varied only by an amount of $\frac{1}{100}$ of its normal value. Such small variations are totally inadequate for the operation of practical detecting or monitoring devices of the type referred to herein. Besides, the unavoidable variations of the radiant energy incident upon the receiver being caused by spurious mechanical displacements or vibrations of the light emitter, a receiver and or auxiliary device (lenses, shutters, etc.), as may occur for instance in textile or the like machines, are likely to exceed the variations caused by the bodies (threads) to be detected, whereby to render the devices principally inoperative and practically unsuited for the special purpose forming the subject of the present invention.

The invention, both as to the foregoing and ancillary objects as well as novel aspects thereof, will be better understood from the following detailed description, taken in conjunction with the accompanying drawing forming part of this specification and wherein:

FIG. 1 illustrates diagrammatically a radiant energy monitoring or detecting system constructed in accordance with the principles of the invention;

FIG. 2 is a partial view showing a preferred shutter design and arrangement in a system according to FIG. 1; and FIG. 3 illustrates the invention as applied to the detection of thread in spinning frame or the like textile machinery.

Like reference numbers denote like parts in the different views of the drawing.

With the foregoing objects in view, the invention, according to one of its aspects, involves generally the provision of a monitoring device of the referred to type being comprised essentially of a source of light or equivalent radiant energy having a relatively small and substantially diffusely radiating surface and a receiver including a light-sensitive (photoelectric) device having a light-responsive or receiving surface preferably equal to the radiating surface of said source and being arranged at a relatively large distance from and with its axis substantially in line with the axis of said radiating surface. In other words, the radiating and receiving surfaces, being advantageously parallel to one another and spaced by a substantial distance in relation to their surface areas, define a luminous beam or bar encompassing an effective space of oblong cylindrical or prismatic configuration determined by the areas of said surfaces, on the one hand, and by the length of said beam, on the other hand. In order to eliminate the effects of ambient light or interfering light sources exterior of said beam on the sensitive surface of the receiver, there are provided in accordance with the present invention a multiplicity of energy-stopping or light-impervious diaphragms or shutter elements having apertures being symmetrical to the axis of and spaced along said beams at predetermined mutual distances from each other. In other words, the effective monitoring region or space provided by said beam is defined in a simple manner without the use of special focusing devices necessitating precise adjustments, while at the same time ensuring extreme response sensitivity, in a manner as will become further apparent as the following description proceeds in reference to the drawing.

Referring more particularly to FIG. 1, the numeral 1 denotes the radiating surface or area of a radiant energy emitter, such as a light source assumed for the purpose of the following discussion, which radiates a substantially non-concentrated or diffuse radiant energy beam or cone 2 a fractional central portion 3 of which provides an oblong beam 3 impinged upon the light-sensitive surface 4 of a radiant energy receiver disposed at a substantial distance from and preferably parallel to and aligned with the axis of the radiating surface 1. The light-sensitive surface 4 is advantageously disposed within a protective housing 5 consisting of opaque or light-impervious material and having an opening or aperture 6 for the admission of the beam or light bar 3.

Disposed along the length and preferably symmetrically to the beam 3 are a plurality of apertured light shutters or diaphragms, 7, 8, 9 and 10, in the example shown, the effective apertures 11, 12, 13, and 14 of which have a dimension such as not to obstruct or intercept the beam 3 on the one hand, and the shutters 7–10 being spaced by mutual distances such as to effectively screen or shield the light-sensitive surface 4 against ambient or other light emanating from interfering primary and/or secondary sources, as indicated by way of example at 15 and 16 in the drawing. If the radiating surface 1 and light-sensitive surface 4 have an area equal to or approximating the cross-sectional dimension of a body 17 to be detected, the device according to the invention exhibits monitoring or detecting capabilities involving an extraordinary response sensitivity, on the one hand, as well as complete freedom from interference by disturbing light sources, on the other hand.

If the light source 1 and/or the receiver 4 and shutters 7–10 are subject to spurious displacement at right angle to the axis of the beam 3 during operation, such as due to vibration of the textile or other machines embodying the monitoring apparatus, the diameter or dimension of the apertures 11–14 at right angle to the beam 3 is at least equal to or greater than the sum of the cross-sectional dimension of said beam and the maximum vibrating amplitudes of the emitter, receiver and/or shutters 7–10 to be expected during operation.

As a result of the foregoing design of the shutters 7–10, the device according to the invention, despite its extreme response sensitivity and freedom from interference by disturbing light sourcs, may be fully and securely protected from the effects of vibration or displacement of any of its parts during operation.

According to an improved feature of the invention, the shutters or diaphragms 7–10 are designed and mutually spaced from each other along the beam 3 and from the light-sensitive surface 4 in such a manner as to ensure a maximum screening or shielding effect from interfering light sources by the use of a minimum of parts or shutter elements, in the manner shown by FIG. 2. Referring to latter, the shutter 7 is disposed at such a distance from the light sensitive surface 4 that the legs of the light acceptance angle, in respect to the effective sensitive surface of the cell 4, of each shutter pass through the outer periphery of the adjacent shutter located on the side of the source 1. As an example, the legs of the acceptance angle 7′ of shutter 11 pass through the periphery of the shutter 12, the legs of the acceptance angle 8′ of the shutter 12 pass through the periphery of the shutter 13, and so on and so forth. In an arrangement of this type it is furthermore advantageous to utilize shutters of equal diameter and apertures and to secure the afore-described relation by varying the mutual spacing distances between the shutters, whereby to enable the achievement of a substantially complete freedom from interference, or attainment of an effective monitoring beam of substantial length by a minimum number of shutter elements of relatively small size or dimension. As an example, it has been found that about eight ring-shaped shutters having an outer diameter of 3 cm. and an inner diameter of 1.5 cm. for a light beam of 4 mm. maximum diameter will be sufficient to completely shield the beam or receiving surface disposed at a distance of 20 meters from the radiator from interfering sources located as close as 1.5 cm. from the axis of said beam, while vibrations at right angle to the axis of the beam having an amplitude of several millimeters will be without effect on the response of the receiver.

According to another feature of improvement of the invention, at least the surfaces of the shutters 7–10 on the side of the light-sensitive surface 4 are treaed or coated to reduce or minimize light reflection, to further reduce interference by extraneous or interfering light. Furthermore, the radiator, receiver and shutters may be fitted with suitable adjusting means or devices for adjusting the position of the parts to achieve optimum shielding and results.

In certain practical uses it may be desirable to temporarily remove any or all of the shutters 7–10. For the latter purpose, the construction, according to a further improved feature of the invention, may be such as to enable rotation, deflection or retraction of the shutters from their normal operative position to an inoperative position, as shown in FIG. 3 which illustrates by way of example and schematically a retractible light shutter embodied in a spinning frame or machine.

Referring more particularly to FIG. 3 which shows a side view of the machine, numeral 19 denotes an angle piece or bracket being secured to a cylinder bank 18 and of a flyer spinning frame, said bracket serving to rotatively support the shutter 7, having an aperture 11, by means of a bolt or pivot 20. Numeral 23 shows one of the threads in the normal position which upon tearing or breakage drops so as to temporarily intercept the beam 3 and to cause a corresponding response in the receiver, to initiate a warning signal or contact region in the manner pointed out. In order to facilitate the removal of the bobbins, flyers and other parts of the spinning machine disposed at least in part close to and below the shutters, the latter may be swung or retracted temporarily from their operative position as shown in the drawing to a raised or inoperative position, either manually or through the aid of suitable operating means. In order to define the exact operative position of the shutters, they may be simply fitted with a stop or abutment 21 engaging the surface 22 of the bank 18, as shown for the single shutter 7 in FIG. 3. Alternatively, the shutters may be provided with any suitable arresting or locking means defining the operative and retracted positions, respectively, and being advantageously operable in the rest position only of the spinning or the like machine in which the device is embodied. Besides, all the shutters may be controlled in unison, such as by mounting the same upon a common control shaft 20 operated by means of a well-known cam and lever or any equivalent mechanism.

In the foregoing, there has been described the use of light as radiant energy, it being understood that any other kind of radiant energy, subject to similar transmission condition as light, may be utilized for the purpose of the invention. For most practical purposes, optical or light energy will be preferred, especially in the form of invisible, such as infra-red or ultra-violet light, to further reduce interference by ambient and other interfering light sources.

In order to limit, in the case of use of the device according to the invention in rooms lit by gaseous discharge lamps, the number of shutter elements to a minimum, it is furthermore possible to utilize light of a spectral color or characteristics which differ from the spectral characteristics of the discharge lamps. Alternatively, light filters may be provided in order to limit the effect of disturbing radiation upon the sensitive receiving surface.

According to a further improved feature of the invention, the radiated energy produced, for intsance, by a gaseous discharge tube, may be modulated at an audio or high frequency rate, to enhance the selectivity of the receiver provided for this purpose with a suitable resonant device, either electric or mechanical, in a manner well known to and readily understood by those skilled in the art.

According to yet another modification of the invention, the radiator may be in the form of an incandescent body having a high thermal inertia, such as an incandescent body or filament energized by a direct current source. Such an arrangement is of special advantage where the radiation receiver is followed by an amplifier responsive to the fluctuations only of the incident and received radiation.

The monitoring device according to the present invention is suited especially for the detection of thread or ribbon breakage in textile machines of all types, such as spinning frames, or equivalent processing apparatus or machines. The invention may, however, be utilized generally for the solution of related or similar problems, that is, involving the supervision of a given space or region as to the presence or temporary appearance therein of any forgein body or bodies of the special shape or configuration described, to produce a warning signal and/or to effect a control operation.

Although the monitoring beam according to the invention requires the provision of a plurality of shutter elements disposed along the length of the beam, the obstruction of the space surrounding the beam by said shutters is practically negligible due to the fact that the shutters may consist of thin disks and the objects to be detected are in the form of thin or attenuated elements, such as threads, wires, etc. in the preferred use and embodiment of the invention.

In the foregoing the invention has been described in reference to a specific illustrative device. It will be evident that variations and modifications, as well as the substitution of equivalent parts for those shown, may be made in accordance with the broader scope and spirit of the invention as defined by the appended claims. The specification and drawing are accordingly to be regarded in an illustrative rather than in a restrictive sense.

I claim:

1. A light bar monitoring system comprising in combination:
    (1) a source of light having a substantially diffusely radiating surface,
    (2) a receiver arranged at a distance from said source and including a light-sensitive surface equal in cross-section to the cross-section of said radiating surface, whereby to define an intervening light bar determined by the cross-section of and distance between said surfaces,
    (3) an array of aligned apertured shutters encircling said bar in mutually spaced relation to each other, said shutters having equal outer diameters and equal light-pervious apertures of a cross-section exceeding the cross-section of said bar, and
    (4) said shutters being spaced by increasing distances in the direction from said receiver to said source such that the legs of the light acceptance angle, in respect to said sensitive surface, of each shutter pass through the outer periphery of the adjacent shutter located on the side of said source.

2. In a light bar monitoring system as claimed in claim 1, including means to temporarily retract said shutters in unison from the operative position defined to an inoperative position exterior of said light bar.

3. In a light bar monitoring system as claimed in claim 2, including abutment means to fix the operative position of said shutters.

References Cited

UNITED STATES PATENTS

| | | | |
|---|---|---|---|
| 1,546,264 | 7/1925 | Story | 250—237 X |
| 2,054,382 | 9/1936 | Larsen et al. | 250—237 X |
| 2,513,283 | 7/1950 | Cahusac et al. | 250—218 |
| 2,967,947 | 1/1961 | Flwok | 250—219 |
| 3,092,727 | 6/1963 | Leinhos et al. | 250—226 |
| 3,094,625 | 6/1963 | Hendrick | 250—218 |
| 3,113,774 | 12/1963 | Blewitt | 250—221 X |
| 3,170,068 | 2/1965 | Petriw et al. | 250—218 X |
| 3,174,046 | 3/1965 | Linemann et al. | 250—219 |
| 3,184,798 | 5/1965 | Burnet et al. | 250—219 |
| 3,207,266 | 9/1965 | Horning | 250—221 X |

RALPH G. NILSON, *Primary Examiner.*

ARCHIE R. BORCHELT, *Examiner.*

M. A. LEAVITT, *Assistant Examiner.*